(12) United States Patent
Egorov et al.

(10) Patent No.: US 6,972,414 B2
(45) Date of Patent: Dec. 6, 2005

(54) METHOD AND APPARATUS FOR PRODUCTION OF 213BI FROM A HIGH ACTIVITY 225AC SOURCE

(75) Inventors: Oleg B. Egorov, West Richland, WA (US); Matthew J. O'Hara, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/808,090

(22) Filed: Mar. 23, 2004

(65) Prior Publication Data

US 2005/0167609 A1    Aug. 4, 2005

Related U.S. Application Data

(60) Provisional application No. 60/457,544, filed on Mar. 24, 2003.

(51) Int. Cl.[7] ............................................. C22B 60/00
(52) U.S. Cl. ........................ 250/432 PD; 423/2; 423/3
(58) Field of Search ...................... 250/432 PD; 423/2, 423/3, 6, 7

(56) References Cited

U.S. PATENT DOCUMENTS 5,749,042 A * 5/1998 Bray et al. ...................... 423/2
6,153,154 A * 11/2000 Egorov et al. .................. 423/2

* cited by examiner

Primary Examiner—Kiet T. Nguyen
(74) Attorney, Agent, or Firm—Douglas E. McKinley, Jr.

(57) ABSTRACT

A method and apparatus for isolating and purifying a $^{213}$Bi radioactive isotope from an $^{225}$Ac source using a primary column and a primary sorbent which preferentially retains $^{225}$Ac over $^{213}$Bi when exposed to a compatible solvent in combination with a secondary column having a secondary sorbent which retains $^{213}$Bi when exposed to a mixture of the compatible solvent and $^{213}$Bi. A "compatible solvent" is a solvent which will preferentially remove $^{213}$Bi radioactive isotopes from a primary sorbent without removing $^{225}$Ac radioactive isotopes, and then allow $^{213}$Bi radioactive isotopes removed from the primary sorbent to be retained on a secondary sorbent, without having to dilute or otherwise chemically or physically modify the compatible solvent in between exposure to the primary and secondary sorbents.

39 Claims, 5 Drawing Sheets

METHOD AND APPARATUS FOR PRODUCTION OF 213BI FROM A HIGH ACTIVITY 225AC SOURCE

CROSS-REFERENCE TO RELATED APPLICATIONS

This application claims priority to Provisional Application Ser. No. 60/457,544 filed Mar. 24, 2003, the entire contents of which are incorporated herein by this reference.

STATEMENT REGARDING FEDERALLY SPONSORED RESEARCH OR DEVELOPMENT

This invention was made with Government support under Contract DE-AC0676RLO1830 awarded by the U.S. Department of Energy. The Government has certain rights in the invention.

BACKGROUND OF THE INVENTION

The use of radiation to kill or neutralize unwanted cell growth such as cancer has led to increasing interest in various species of radioactive isotopes. Of particular interest are radioactive isotopes, such as $^{213}$Bi, which emit alpha radiation, or alpha emitters, because the alpha radiation emitted by these radioactive isotopes does not penetrate deeply into tissue. $^{213}$Bi is normally produced as a daughter product of $^{229}$Th (half-life= 7,300 y). The radioactive decay chain in which $^{213}$Bi is found is well known: $^{233}$U (half-life= 1.62×10$^5$ yr)→$^{229}$Th (half-life=7,300 yr)→$^{225}$Ra (half-life=14.8 day)→$^{225}$Ac (half-life=10 day)→$^{213}$Bi (half-life=46 min).

One Bi generator system used to separate and isolate $^{213}$Bi from $^{225}$Ac is described in U.S. Pat. No. 5,749,042 to Bray, et al. (The entire contents of the Bray patent, together with any and all other patents, papers, articles, or other written materials referenced in this application are hereby fully incorporated into the disclosure of this application as if they had been reproduced herein in their entirety.) In the Bray patent, a solution containing the radioactive isotope $^{225}$Ac and hydrochloric acid is combined with an anion exchange resin, whereupon the daughter product of the $^{225}$Ac, $^{213}$Bi, is absorbed the from the "cow" solution and adheres onto the anion exchange resin as a chloride complex. Traces of the $^{225}$Ac cow and the acid from the anion exchange resin are then removed, leaving a chloride complex which adheres the $^{213}$Bi to the anion exchange resin. A stripping solution is then provided which weakens or destroys the chloride complex, thereby releasing the $^{213}$Bi from the anion exchange resin. The "cow" solution containing is recovered and used for subsequent continuing production of the $^{213}$Bi after its ingrowth.

Because of its short half-life of 45.6 minutes, it is highly advantageous to generate $^{213}$Bi at the point of use, typically in a clinical setting. While $^{213}$Bi can be conveniently obtained from an $^{225}$Ac generator system such as the system taught by Bray et al., there are significant problems associated with the use of these known generator systems in clinical settings. For example, a generator system that generates significant volumes of solvents can create significant expense, as these solvents typically require expensive and specialized methods for disposal. The generator system must also be capable of reliably operating with high levels of $^{225}$Ac (e.g., 100–150 mCi) over a period of several weeks.

Another approach for generating the radioactive isotope $^{213}$Bi is presently in use at the Memorial Sloan Kettering Cancer Center, and is described in Applied Radiation and Isotopes, 50 (1999) 895–904, "An $^{225}$Ac/$^{213}$Bi generator system for therapeutic clinical applications: construction and operation", McDevitt et al. and Applied Radiation and Isotopes, "Breakthrough of $^{225}$Ac and its Radionuclide Daughters, 55 (2001) 667–678, Ma et al. According to this method, an Ac-225 source is distributed on a small column of the polymer-based cation exchange resin (e.g., AG MP-50, Dowex-50, etc.), which has good affinity and selectivity for $^{225}$Ac over $^{213}$Bi in HCl media. The $^{213}$Bi product is periodically eluted using a suitable eluent solution, such as, a 0.1 M HCl/0.1 M NaI solution, while $^{225}$Ac remains on the column during the useful life of the generator system. While this system does have certain advantages, the cumulative radiation dose to a small mass of a functionalized organic resin by a $^{225}$Ac source, typically having activity greater than 20 mCi, is substantial. This intense radiation dose will typically cause damage to the sorbent material and result in generator failure over extended periods of operation. Furthermore, the continuous generation of radical species on the resin and in the generator eluate can lead to poor radiochemical labeling yields, and a poor recovery of the radioactive isotope product. Therefore, the use of the polymer-based sorbent materials in a single generator column of a small volume present numerous drawbacks for use as generator systems in clinical environments.

An automated generator system using a $^{225}$Ac source has also been reported previously which sought to alleviate concerns regarding the radiolytic degradation of the resin (Egorov et al., 1998, U.S. Pat. No. 6,153,154). Compared to the column generator format, this liquid source approach is more difficult to implement in an automated sterile regime, and requires the use of disposable fluidic components.

Wu et al. (Radiochimica Acta,79, 141–144, 1997) described a tandem-column generator system using a silica-gel based extraction chromatographic material for $^{225}$Ac storage. A secondary cation exchange column was used to capture the $^{213}$Bi eluted from the primary column in 1 M solution of hydrochloric acid. A substantial dilution of the eluent (about ten-fold) was necessary prior to loading $^{213}$Bi on the cation exchange column, which makes operation of such a generator system cumbersome and which also leads to generation of significant quantities of waste. However, the use of a silica-gel based material was noted to improve radiolytic stability of the generator system. Moreover, the tandem column approach improved the $^{213}$Bi product purity and provided additional safety with regard to the $^{225}$Ac breakthrough.

Thus, despite these and other advances, there remains a need for a $^{213}$Bi generator system that can be used in a clinical setting, and which minimizes the creation of secondary wastes and which provides the $^{213}$Bi in a form which is compatible with biological applications.

BRIEF SUMMARY OF THE INVENTION

Accordingly, it is an object of the present invention to provide a method and apparatus for isolating and purifying a $^{213}$Bi radioactive isotope from an $^{225}$Ac source without generating excessive waste.

It is a further object of the present invention to provide an automated apparatus for isolating and purifying a $^{213}$Bi radioactive isotope from an $^{225}$Ac source.

It is a further object of the present invention to provide an automated apparatus for isolating and purifying a $^{213}$Bi radioactive isotope from an $^{225}$Ac source which avoids the need for additional solutions or other modifications necessary to effect dilution, pH adjustment, or other chemical and/or physical modifications of the solvent used to separate the $^{213}$Bi $^{225}$Ac source.

These and other objects are accomplished by providing a primary column having an inlet, an outlet, and a primary sorbent which preferentially retains $^{225}$Ac over $^{213}$Bi when exposed to a compatible solvent. A secondary column having an inlet and an outlet is also provided, wherein the inlet is in communication with the outlet of the primary column. The secondary column also has a secondary sorbent which retains $^{213}$Bi when exposed to a mixture of the compatible solvent and $^{213}$Bi. $^{225}$Ac is first loaded onto the primary sorbent, The compatible solvent is then flowed through the primary column and into the secondary column, thereby transferring $^{213}$Bi formed as a radioactive decay product of the $^{225}$Ac in the primary column to the secondary column. The $^{213}$Bi is retained on the secondary sorbent, by flowing an eluent through the secondary column, the $^{213}$Bi may be removed from the secondary column, and then used, for example in a radiotherapeutic application. One aspect of the present invention which provides significant advantages when compared to prior art systems for generating $^{213}$Bi radioactive isotopes from an $^{225}$Ac radioactive isotope source is a result of the present invention's the use of a "compatible solvent." When combined with an appropriate primary sorbent and an appropriate secondary sorbent, a "compatible solvent" will simultaneously preferentially remove $^{213}$Bi radioactive isotopes from the first sorbent, while allowing $^{213}$Bi radioactive isotopes to be retained on the secondary sorbent, without having to dilute or otherwise chemically or physically modify or alter the solvent. In this manner, a highly purified $^{213}$Bi radioactive isotope can be retained on the secondary sorbent without requiring an intermediate step, such as, for example, dilution or altering the pH of the solvent, in between the step of removing the $^{213}$Bi radioactive isotope from the primary sorbent and the step of retaining the $^{213}$Bi radioactive isotope on the secondary sorbent. This allows the isolation and purification of the $^{213}$Bi radioactive isotope without generating excessive waste, and/or configuring the system to provide additional solutions or other modifications necessary to effect dilution, pH adjustment, or other chemical and/or physical modifications of the solvent. In this manner, the method of the present invention greatly minimizes the requirements for additional fluids, and the valves, pumps, and reservoirs associated with such additional fluids, used to accomplish the separation. This in turn simplifies construction of the apparatus of the present invention, particularly in an automated configuration, where the apparatus of the present invention is configured to isolate and purify $^{213}$Bi radioactive isotopes automatically. Further, since the compatible solvent is not diluted and the $^{213}$Bi is concentrated on the secondary column, a larger mass of the primary sorbent may be used in combination with the same amount of solvent ultimately flowed through the second sorbent, when compared to prior art systems. In this manner, the same amount of $^{225}$Ac is distributed over a larger mass of the primary sorbent, reducing damage to the sorbent material caused by the radioactive attack of the $^{225}$Ac, reducing the frequency of generator failure, and allowing longer periods of operation without interruption. This advantage of the present invention is of particular importance when the present invention is used to generate $^{213}$Bi radioactive isotopes in a clinical environment for cancer treatments. In such a circumstance, failures of a $^{213}$Bi generator could cause delays in carefully scheduled radiotherapy treatments, thereby interfering, for example, with an optimal treatment regimen for life threatening cancerous growths.

As used herein, a "compatible solvent" is defined as a solvent which will preferentially remove $^{213}$Bi radioactive isotopes from a primary sorbent without removing $^{225}$Ac radioactive isotopes, and then allow $^{213}$Bi radioactive isotopes removed from the primary sorbent to be retained on a secondary sorbent, without having to dilute or otherwise chemically or physically modify the compatible solvent in between exposure to the primary and secondary sorbents. Those having the benefit of this disclosure and ordinary skill in the art will therefore recognize that a given solvent which would be considered "compatible" when used with one set of primary and secondary sorbents, may not be considered "compatible" when used with another set of primary and secondary sorbents. Thus, the determination of whether or not a particular solvent is "compatible" can only be determined in the context of a particular set of primary and secondary sorbents, in much the same manner, for example, that a particular solution can only be considered as "basic" or "acidic" when it is compared to another solution.

Preferred primary sorbents include inorganic matrices impregnated with sulfonic, phosphoric, or phosphonic acid extractants, and combinations thereof, polymeric matrices impregnated with sulfonic, phosphoric, or phosphonic acid extractants, and combinations thereof, and said functionalities grafted onto supports, including polymeric supports, silica supports, inorganic particulate supports, and combinations thereof. The resin may be chelating resins, cation exchange resins, and combinations thereof. Chelating resins include materials having a diphosphonic acid, organophosphoric acid or other chelating functionality grafted on the support. Cation exchange resins include materials having a sulfonic acid functionality grafted on the support and materials having carboxylic acid functionalities grafted on the support.

The preferred secondary sorbent is an anion exchange resin grafted on either polymeric supports, silica supports, inorganic supports, and combinations thereof. The preferred anion exchange resin is a long chain ammonium salt, and more preferably a quaternary ammonium salt, a tertiary ammonium salt, or a combination thereof. The secondary sorbent can be utilized in the column form in the form of a disc or membrane.

Compatible solvents include HCl solutions. In one configuration, an HCl solution of about 1 M is preferred. In another configuration, an HCl solution of between about 0.1 and 0.2M is preferred.

In one configuration, an eluent of sodium acetate solution between about 0.1 and 0.5 M with a pH of about 5 or acetic acid concentration of 0.5 M is preferred.

Figure 1:
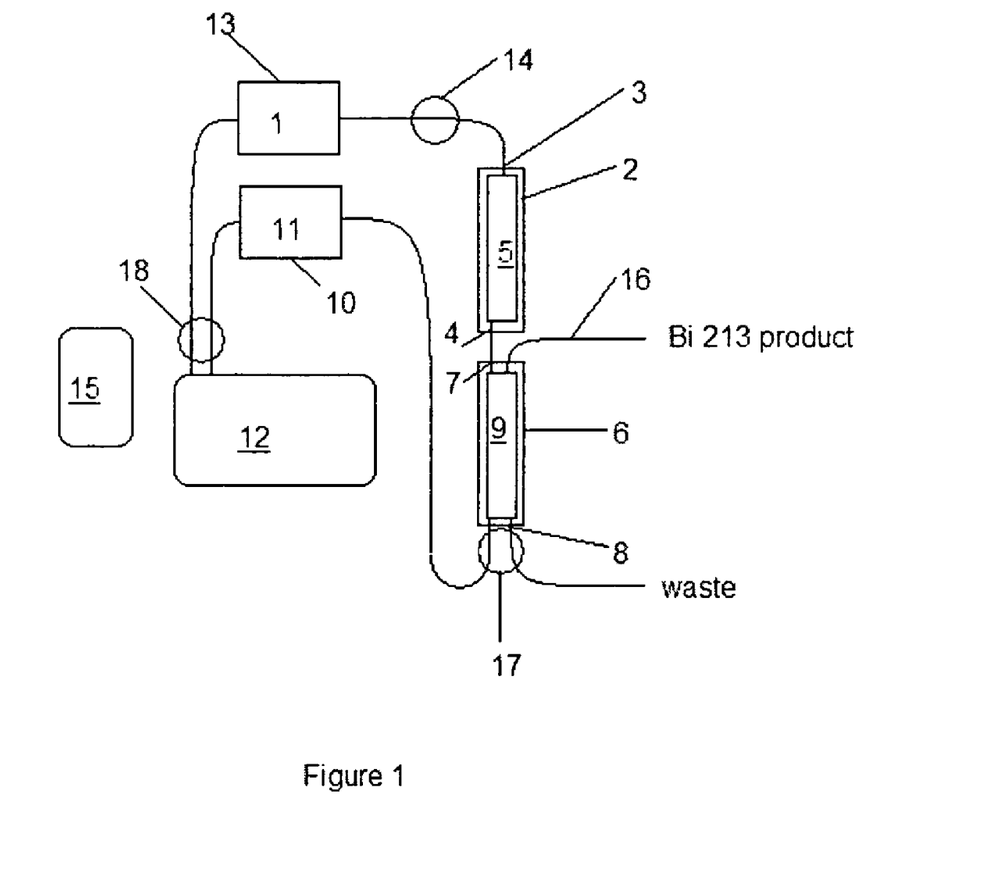
FIG. 1 is a schematic drawing of one possible arrangement of the present invention showing the key features of the present invention together with numerous optional features.

Apparatus that are considered as falling within the scope of the present invention can be configured many ways, however, all such apparatus have certain common elements. As shown in FIG. 1, the apparatus of the present invention has a compatible solvent 1, a primary column 2 having an inlet 3, an outlet 4, a primary sorbent 5 which preferentially retains $^{225}$Ac over $^{213}$Bi when exposed to the compatible solvent 1, a secondary column 6 having an inlet 7 and an outlet 6. The inlet 7 of the secondary column in communication with the outlet 4 of the primary column, and the secondary column 6 further has a secondary sorbent 9 which retains $^{213}$Bi when exposed to a mixture of the compatible solvent and $^{213}$Bi.

As further illustrated in FIG. 1, preferred configurations of the apparatus of the present invention may further include an eluent reservoir 10 containing a eluent 11, the eluent 11 capable of removing $^{213}$Bi from the secondary sorbent 9, and the eluent reservoir 10 in communication with the secondary column 2. Preferred configurations may further include at least one pump 12 in communication with the primary column 2 and configured to pump the compatible solvent 1 through the primary column 2 and the secondary column 6. Preferred configurations of the apparatus of the present invention may further include a compatible solvent reservoir 13, a first valve 14, and a controller 15. The first valve 14 is advantageously disposed to control the flow of the compatible solvent 1 to the primary column 2. The controller 15 is in communication with the pump 12 and the first valve 14 and is thereby configured to operate the pump 12 and the first valve 14 such that the first valve 14 is opened and the compatible solvent 1 is pumped through the primary column 2 and the secondary column 6 at predetermined intervals to retain said $^{213}$Bi on the secondary sorbent 9. A second valve 17 may further be provided and disposed to control the flow of the eluent 11 through the secondary column 6. A second outlet 16 on the secondary column 6, or an equivalent arrangement, is also preferred, so long as the arrangement allows the eluent 11 to be flowed through the secondary column 6 in the opposite direction the compatible solvent 1 is flowed through the secondary column 6.

While those skilled in the art having the benefit of this disclosure will readily recognize that multiple pumps may be provided, a solution that allows the use of a single pump 12 may utilize a third valve 18 which is configured to allow the pump to alternate between flowing the compatible solvent 1 through the primary column 2 and the secondary column 6, and flowing the eluent 11 through the secondary column 6. As shown in FIG. 1, the controller 15 may further be configured to control the first valve 14, the second valve 17, the third valve 18, and the pump 12, so that, alternately the compatible solvent 1 is first pumped through the primary column 1 and the secondary column 6 at predetermined intervals to retain said $^{213}$Bi on the secondary sorbent 9, and the eluent 11 is then pumped through the secondary column 6, providing the $^{213}$Bi at the second outlet 16 of the secondary column 6.

While the illustration shown in FIG. 1 shows one workable design of the apparatus of the present invention, those having skill in the art and the benefit of this disclosure will readily recognize that numerous alternative arrangements are possible. Additional pumps and valves, for example, may be deployed. These additional pumps and valves can be positioned, for example and not to be limiting, to prevent flow between the primary column 2 and the secondary column 6 when the eluent 11 is removing the $^{213}$Bi from the secondary sorbent. Additionally, a wide variety of alternate piping arrangements, together with additional outlets and inlets to the primary and secondary columns might be provided, for example, and not meant to be limiting, to allow the introduction of a wash solution. These arrangements should be considered as being encompassed by the present invention, provided that they utilize a primary and a secondary column in combination with a compatible solvent.

Further, the controller may be a microcontroller which may be limited to the operation of the apparatus of the present invention, or it might be operated on a general purpose computer, for example running a software program that has been designed to control the valves and pumps with the correct timing, and which is operated to perform more functions beyond the control of the apparatus. In either case, means for a user to monitor the operation of the controller, such as a CRT display, and/or means, such as a mouse or a keyboard, that allow a user to change the parameters of the controller, such as the timing or quantities of compatible solvent that are flowed through the primary and secondary columns, are intended to be included in the meaning of the term "controller" as used by the applicant. These various configurations, together with valves, syringes, and pumps which may be operated by electronic signals, by using solenoids for example, are common in automated control systems and are well understood by those having ordinary skill in the art. No further description is therefore required to enable those having ordinary skill in the art to devise suitable automated control systems that will successfully control and operate the apparatus described herein.

In addition to various alternative arrangements for additional valves and pipes, additional primary columns 2, similar or identical to the primary column 2 shown in FIG. 1 may be employed to increase the production rate of the $^{213}$Bi. These additional primary columns may be employed in series or in parallel, as determined by the user.

DETAILED DESCRIPTION OF THE INVENTION

A variety of experiments were undertaken to demonstrate various combinations of materials suitable for use as the compatible solvent and for use as primary and secondary sorbents. In addition to finding a secondary sorbent suitable for use with a compatible solvent, the ability of the secondary sorbent to elute $^{213}$Bi with an elutant that would be acceptable for use as a solution in which the $^{213}$Bi could be successfully combined with therapeutic biomolecules was also a consideration. While these experiments show various combinations that achieve the objectives of the present invention, they should in no way be viewed as limiting the scope of the present invention. As described in the forgoing Summary of the Invention, a wide variety of materials are capable of being effectively utilized in the present invention. Accordingly, the experiments described below should only be considered as illustrative examples of the present invention, and the scope of the claims that follow should in no way be viewed as limited by or to these illustrative examples.

Figure 2:
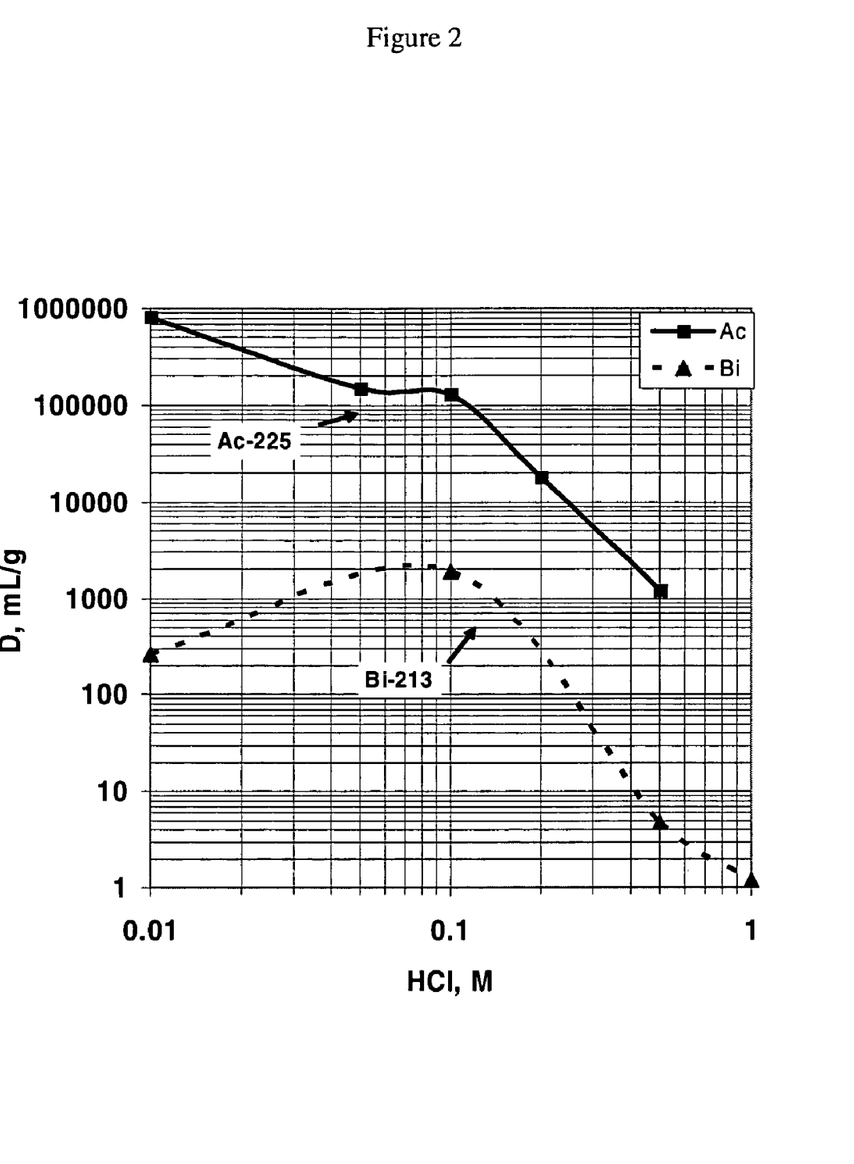
FIG. 2 is a graph showing the uptake characteristics of a silica grafted sorbent material having a crown ether chelating functionality for both $^{213}$Bi and $^{225}$Ac as a function of the molar concentration of an HCl solvent.

One material investigated for use as a sorbent is a silica grafted sorbent material having a crown ether chelating functionality sold under the trade name "Superlig 643" by IBC Advanced Technologies of American Fork, Utah. FIG. 2 shows the uptake characteristics of this sorbent for both $^{213}$Bi and $^{225}$Ac. As shown in the graph, the selection of the compatible solvent of about 1 M HCl, this material preferentially retains $^{225}$Ac, while $^{213}$Bi is not retained and is elutable. This material is thus suitable for the elution of the primary column. As shown in FIG. 2, the molar strength of the HCl used as a compatible solvent with this sorbent need not be exactly 1 M. Accordingly, those having skill in the art having the benefit of this disclosure will appreciate that the use of the term "about" in describing the molar concentration of the compatible solvent is intended to recognize that a range of molar concentration will meet the objectives of the present invention, and that any and all of those concentrations that meet the definition of "compatible solvent" as set forth in this disclosure should be included.

Figure 3:
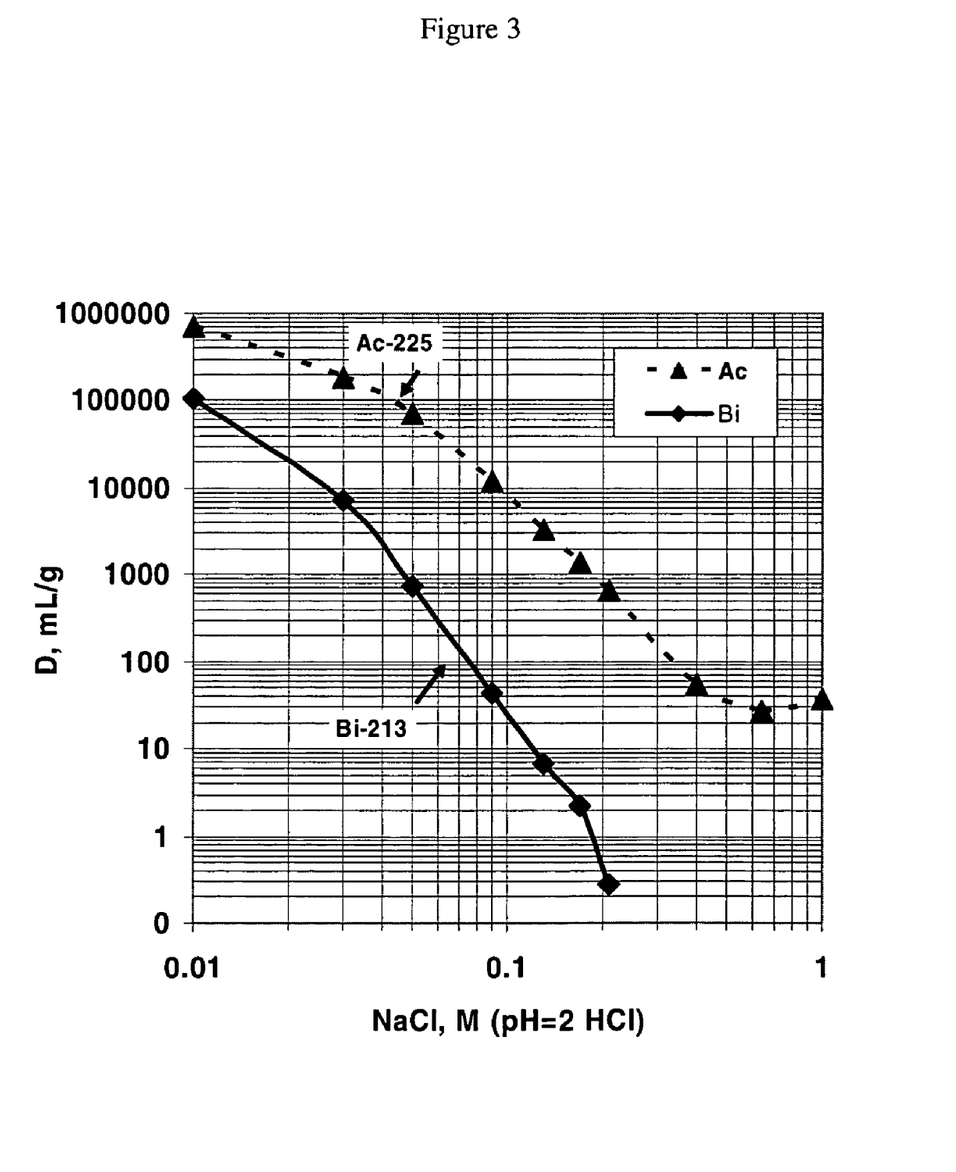
FIG. 3 is a graph showing the uptake characteristics of a silica grafted cation exchange sorbent for both $^{213}$Bi and $^{225}$Ac as a function of the molar concentration of a NaCl solvent in a mixture with 0.01 M HCl, where the molar concentration of the HCl is held constant.

FIG. 3 shows the uptake characteristics of a silica grafted cation exchange sorbent sold under the tradename SCX by SUPELCO of Bellefonte, Pa. showing selection of the compatible solvent of between about 0.2 M NaCl and about 0.01 M HCl for the elution of the primary column. As shown in the graph, when exposed to a compatible solvent of about 0.2 M NaCl mixed with 0.01 M HCl, this material preferentially retains $^{225}$Ac, while $^{213}$Bi is not retained and is elutable.

Figure 4:
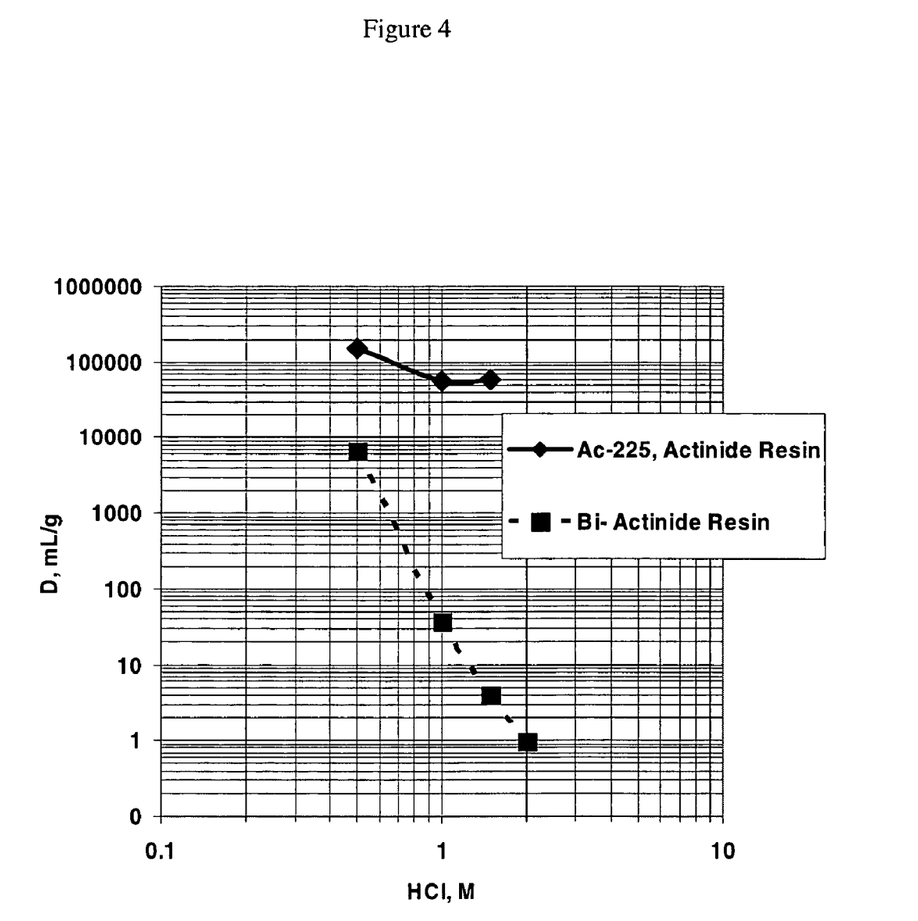
FIG. 4 is a graph showing the uptake characteristics of a silica sorbent impregnated with diphosphonic extractant (Actinide Resin) for both $^{213}$Bi and $^{225}$Ac as a function of the molar concentration of an HCl solvent.

FIG. 4 shows the uptake characteristics of a silica sorbent impregnated with diphosphonic extractant (Actinide Resin) available from Eichrom Technologies, Inc, of Darien, Ill. As shown in FIG. 4, a compatible solvent of 2 M HCl is appropriate for the elution of the primary column.

Figure 5:
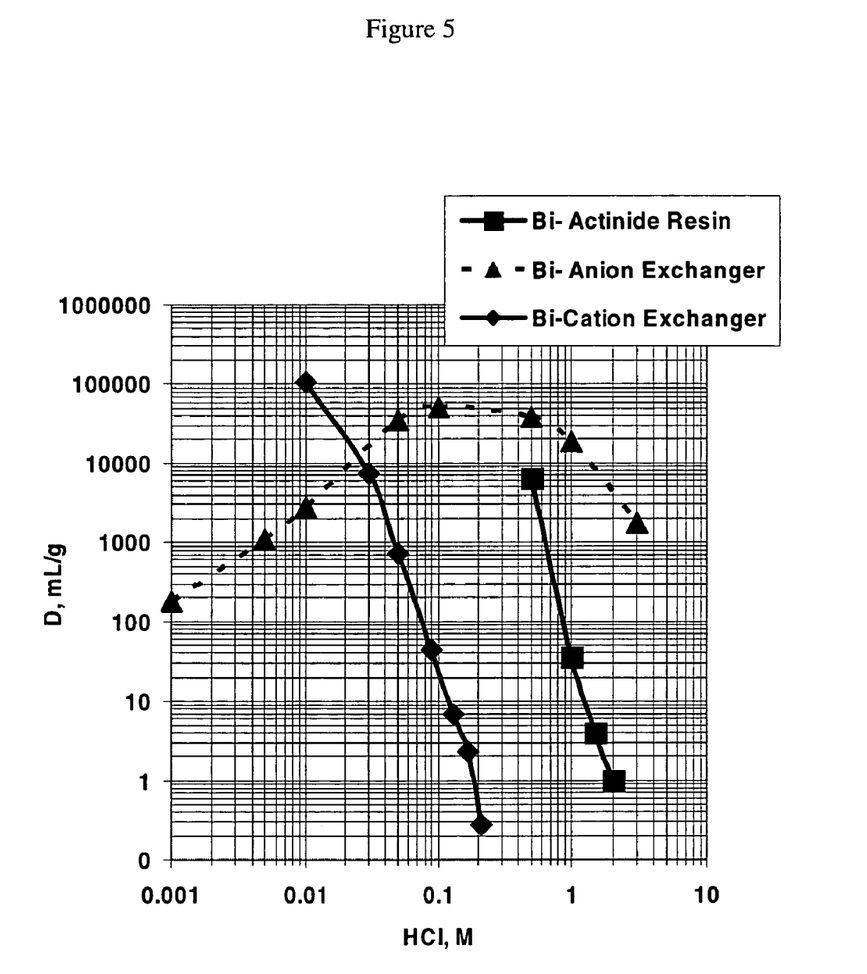
FIG. 5 is a set of graphs showing the uptake characteristics of a polymer grafted cation exchange material; a silica impregnated with diphosphonic extractant (Actinide Resin); and a polymer grafted strongly basic anion exchanger for both $^{213}$Bi and $^{225}$Ac as a function of the molar concentration of an HCl solvent.

FIG. 5 shows the $^{213}$Bi uptake characteristics of a polymer grafted cation exchange material sold under the tradename MP-50 by Bio-Rad Laboratories, Hercules, Calif.; a silica impregnated with diphosphonic extractant (Actinide Resin) available from Eichrom Technologies, Inc, of Darien, Ill.; and a polymer grafted strongly basic anion exchanger sold under the tradename MP-1M by Bio-Rad Laboratories, Hercules, Calif. FIG. 5 thus shows how the selection of the compatible solvent for the operation of the two tandem column generator systems is possible. The $^{213}$Bi is readily eluted from cation exchange material using about 0.6–1 M HCl, and the $^{213}$Bi is readily eluted from Actinide Resin using 2 M HCl. In both cases, the $^{225}$Ac will be effectively retained by the anion exchange material. Thus, for the systems where the anion exchange material is used in the primary column and the cation exchange material is used in the secondary column, 0.6–1 M HCl solution represents a compatible solvent, and for systems where the anion exchange material is used in the primary column and where the Actinide Resin is used as the secondary column, 2 M HCl represents a compatible solvent.

Additional experiments were conducted to demonstrate the tandem column generator operation in the flow regime. In the specific example the primary column was comprised of strongly acidic cation exchanger (MP-50) column (bed volume 3 mL) with 3 mCi of $^{225}$Ac uniformly distributed throughout the two thirds of the column bed. The secondary column was comprised of the strongly basic anion exchanger resin (MP-1M) with the bed volume of 0.120 mL. The primary column was eluted using 6 mL of the 1 M HCl a at the flow rate of 3 mL/min. The eluent was delivered to the secondary column connected to the outlet of the primary column. Next the secondary column was rinsed with 1 mL of 1 mM HCl and then eluted using 6 mL of 0.5 acetic acid at flow rate 2 mL/min. The eluent was collected and used for subsequent labeling of the CHX-A-HuM-195 monoclonal antibody used in the treatment of leukemia. The tandem column total generator yield was 92%. The IgG labeling yield determined by the ITLC was 91%.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for the production and purification of a $^{213}$Bi radioisotope from an $^{225}$Ac radioisotope source comprising:
   a. a compatible solvent,
   b. a primary column having an inlet, an outlet, and a primary sorbent which preferentially retains $^{225}$Ac over $^{213}$Bi when exposed to said compatible solvent,
   c. a secondary column having an inlet and an outlet, said inlet in communication with the outlet of said primary column, said secondary column further having a secondary sorbent which retains $^{213}$Bi when exposed to a mixture of said compatible solvent and $^{213}$Bi.

2. The apparatus of claim 1 further comprising an eluent reservoir containing a eluent, said eluent capable of removing said $^{213}$Bi from said secondary sorbent, and said eluent reservoir in communication with said secondary column.

3. The apparatus of claim 1 further comprising at least one pump in communication with said primary column and configured to pump said compatible solvent through said primary and secondary columns.

4. The apparatus of claim 3 further comprising:
   a compatible solvent reservoir,
   a first valve, and
   a controller,
   said first valve disposed to control the flow of said compatible solvent to said primary column,
   said controller in communication with said pump and said first valve and configured to operate said pump and said first valve such that said first valve is opened and said compatible solvent is pumped through said primary and secondary columns at predetermined intervals to retain said $^{213}$Bi on said secondary sorbent.

5. The apparatus of claim 4 further comprising a second valve, said second valve disposed to control the flow of said eluent through said secondary column.

6. The apparatus of claim 5 further comprising a second outlet on said secondary column, thereby allowing said eluent to be flowed through said secondary column in the opposite direction said compatible solvent is flowed through said secondary column.

7. The apparatus of claim 6 further comprising a third valve, wherein third valve is configured to allow said pump to alternate between
   a. flowing said compatible solvent through said primary and secondary columns, and
   b. flowing said eluent through said secondary column.

8. The apparatus of claim 7 wherein said controller is further configured to control said first valve, said second valve, said third valve, and said pump, so that, alternately a. said compatible solvent is pumped through said primary and secondary columns at predetermined intervals to retain said $^{213}$Bi on said secondary sorbent, and b. said eluent is pumped through said secondary column, providing said $^{213}$Bi at said second outlet of said secondary column.

9. The apparatus of claim 5 wherein said eluent is a sodium acetate solution between about 0.1 and 0.5 M with a pH of about 5.

10. The apparatus of claim 5 wherein said eluent is an acetic acid solution of about 0.5 M.

11. The apparatus of claim 1, wherein said primary sorbent is a resin bonded to a support selected from the group of polymeric supports, silica supports, inorganic particulate supports, or combinations thereof.

12. The apparatus of claim 11 wherein said primary sorbent is selected as a resin grafted on a support selected from the group: polymeric supports, silica supports, inorganic particulate supports, and combinations thereof.

13. The apparatus of claim 12, wherein said resin is selected from the group of chelating resins, cation exchange resins, and combinations thereof.

14. The apparatus of claim 13, wherein said chelating resin is selected from the group of materials having a diphosphonic acid functionality and materials having a organophoshoric acid functionality grafted on said support.

15. The apparatus of claim 13, wherein said cation exchange resin is selected from the group of: materials having a sulfonic acid functionality grafted on said support and materials having carboxylic acid functionalities grafted on said support.

16. The apparatus of claim 1, wherein said primary sorbent is selected from the group of:
a. inorganic matrices impregnated with sulfonic, phosphoric, or phosphonic acid extractants, and combinations thereof, and
b. polymeric matrices impregnated with sulfonic, phosphoric, or phosphonic acid extractants, and combinations thereof.

17. The apparatus of claim 1, wherein said secondary sorbent is an anion exchange resin grafted on a support selected from the group of polymeric supports, silica supports, inorganic supports, and combinations thereof.

18. The apparatus of claim 17, wherein said anion exchange resin is selected as a long chain ammonium salt.

19. The apparatus of claim 18, wherein said long chain ammonium salt is selected from the group of quaternary ammonium salt, tertiary ammonium salt, and combinations thereof.

20. The apparatus of claim 1 wherein said compatible solvent is selected as an HCl solution.

21. The apparatus of claim 20 wherein said HCl solution is about 1.0 M.

22. The apparatus of claim 20 wherein said HCl solution is between about 0.1 and 0.2M.

23. The apparatus of claim 1 wherein one or more additional primary columns are interfaced with said secondary column.

24. The apparatus of claim 23 wherein said primary columns are in series.

25. The apparatus of claim 23 wherein said primary columns are in parallel.

26. A method for the production and purification of a $^{213}$Bi radioisotope from an $^{225}$Ac radioisotope source comprising the steps of:

a. providing a primary column having an inlet, an outlet, and a primary sorbent which preferentially retains $^{225}$Ac over $^{213}$Bi when exposed to a compatible solvent, b. providing a secondary column having an inlet and an outlet, said inlet in communication with the outlet of said primary column, said secondary column further having a secondary sorbent which retains $^{213}$Bi when exposed to a mixture of said compatible solvent and $^{213}$Bi, c. loading $^{225}$Ac onto the primary sorbent, d. flowing said compatible solvent through the primary column and into the secondary column, thereby transferring $^{213}$Bi formed as a radioactive decay product of said $^{225}$Ac in the primary column to the secondary column, e. retaining said $^{213}$Bi on the secondary sorbent, and f. flowing an eluent through the secondary column, thereby removing the $^{213}$Bi from the secondary column.

27. The method of claim 26 wherein said primary sorbent is selected from the group of:
a. inorganic matrices impregnated with sulfonic, phosphoric, or phosphonic acid extractants, and combinations thereof, and
b. polymeric matrices impregnated with sulfonic, phosphoric, or phosphonic acid extractants, and combinations thereof.

28. The method of claim 26 wherein said primary sorbent is selected as a resin grafted on a support selected from the group: polymeric supports, silica supports, inorganic particulate supports, and combinations thereof.

29. The method of claim 28, wherein said resin is selected from the group of chelating resins, cation exchange resins, and combinations thereof.

30. The method of claim 29, wherein said chelating resin is selected from the group of materials having a diphosphonic acid functionality and materials having a organophoshoric acid functionality grafted on said support.

31. The method of claim 29, wherein said cation exchange resin is selected from the group of: materials having a sulfonic acid functionality grafted on said support and materials having carboxylic acid functionalities grafted on said support.

32. The method of claim 26, wherein said secondary sorbent is an anion exchange resin grafted on a support selected from the group of polymeric supports, silica supports, inorganic supports, and combinations thereof.

33. The method of claim 32, wherein said anion exchange resin is selected as a long chain ammonium salt.

34. The method of claim 33, wherein said long chain ammonium salt is selected from the group of quaternary ammonium salt, tertiary ammonium salt, and combinations thereof.

35. The method of claim 26 wherein said compatible solvent is selected as an HCl solution.

36. The method of claim 35 wherein said HCl solution is about 1.0 M.

37. The method of claim 35 wherein said HCl solution is between about 0.1 and 0.2M.

38. The method of claim 26 wherein said eluent is a sodium acetate solution between about 0.1 and 0.5 M with a pH of about 5.0.

39. The method of claim 26 wherein said eluent is a acetic acid solution of about 5.0 M.

* * * * *